United States Patent [19]

Staats et al.

[11] 4,179,325

[45] Dec. 18, 1979

[54] APPARATUS FOR MANUFACTURING ADHESIVE COVERS

[75] Inventors: Henry N. Staats, Deerfield; Waldemar M. Schmidt, Niles; Efrain A. Davila, Chicago, all of Ill.

[73] Assignee: General Binding Corporation, Northbrook, Ill.

[21] Appl. No.: 912,831

[22] Filed: Jun. 5, 1978

Related U.S. Application Data

[63] Continuation of Ser. No. 558,794, Mar. 17, 1975, abandoned.

[51] Int. Cl.² .................... B05C 1/02; B05C 1/04; B42C 9/00

[52] U.S. Cl. .................... 156/498; 11/1 AD; 11/2; 118/241; 118/255; 118/256; 118/258; 156/500; 156/510; 156/537; 156/548; 156/578

[58] Field of Search .................... 156/242, 244.11, 257, 156/268, 289, 356, 390, 477 B, 498, 499, 500, 510, 517, 537, 548, 578, 244.18, 244.19, 244.23; 118/45, 241, 242, 255, 256, 258; 11/1 R, 1 AD, 1 CP, 2; 93/1 G, 36 MM, 56 PD; 281/21 R, 29

[56] References Cited

U.S. PATENT DOCUMENTS

| | | | |
|---|---|---|---|
| 1,679,871 | 8/1928 | Olgay | 156/477 B |
| 2,093,995 | 9/1937 | Blow | 118/45 |
| 2,660,148 | 11/1953 | Fogg | 156/477 B |
| 3,093,396 | 6/1963 | Segreto | 156/477 B |
| 3,188,114 | 6/1965 | O'Brien et al. | 11/1 R |
| 3,223,436 | 12/1965 | Becker | 156/477 B |
| 3,314,089 | 4/1967 | Margolis et al. | 11/2 |
| 3,423,107 | 1/1969 | Potter et al. | 281/21 R |
| 3,425,393 | 2/1969 | Shuh et al. | 118/241 |
| 3,508,754 | 4/1970 | Shorin | 156/289 |
| 3,580,774 | 5/1971 | Clarke et al. | 156/289 X |
| 3,854,385 | 12/1974 | Wallin | 156/578 X |
| 3,964,770 | 6/1976 | Abildgaard et al. | 281/29 |

Primary Examiner—Michael G. Wityshyn
Attorney, Agent, or Firm—Hill, Van Santen, Steadman, Chiara & Simpson

[57] ABSTRACT

Apparatus and method for the manufacture of adhesive covers in which cover material is conveyed through an apparatus wherein a hot melt adhesive is applied to selected portions of the cover material, a release agent is applied to the adhesive and the adhesive on the cover material is cooled. The apparatus includes a novel hot melt adhesive applicator which is adapted to break the string of adhesive stretching from the hot melt bead on the cover to the applicator nozzle. One embodiment of the unit involves an in-line arrangement in which individual covers are processed. Another embodiment involves an in-line arrangement in which web of cover material flows continuously through various operations and is then cut at the end into individual covers. Another embodiment involves an in-line arrangement in which a web of transparent cover material is incorporated in the process and combined with a web of cover material overlapping a portion of the latter.

21 Claims, 9 Drawing Figures

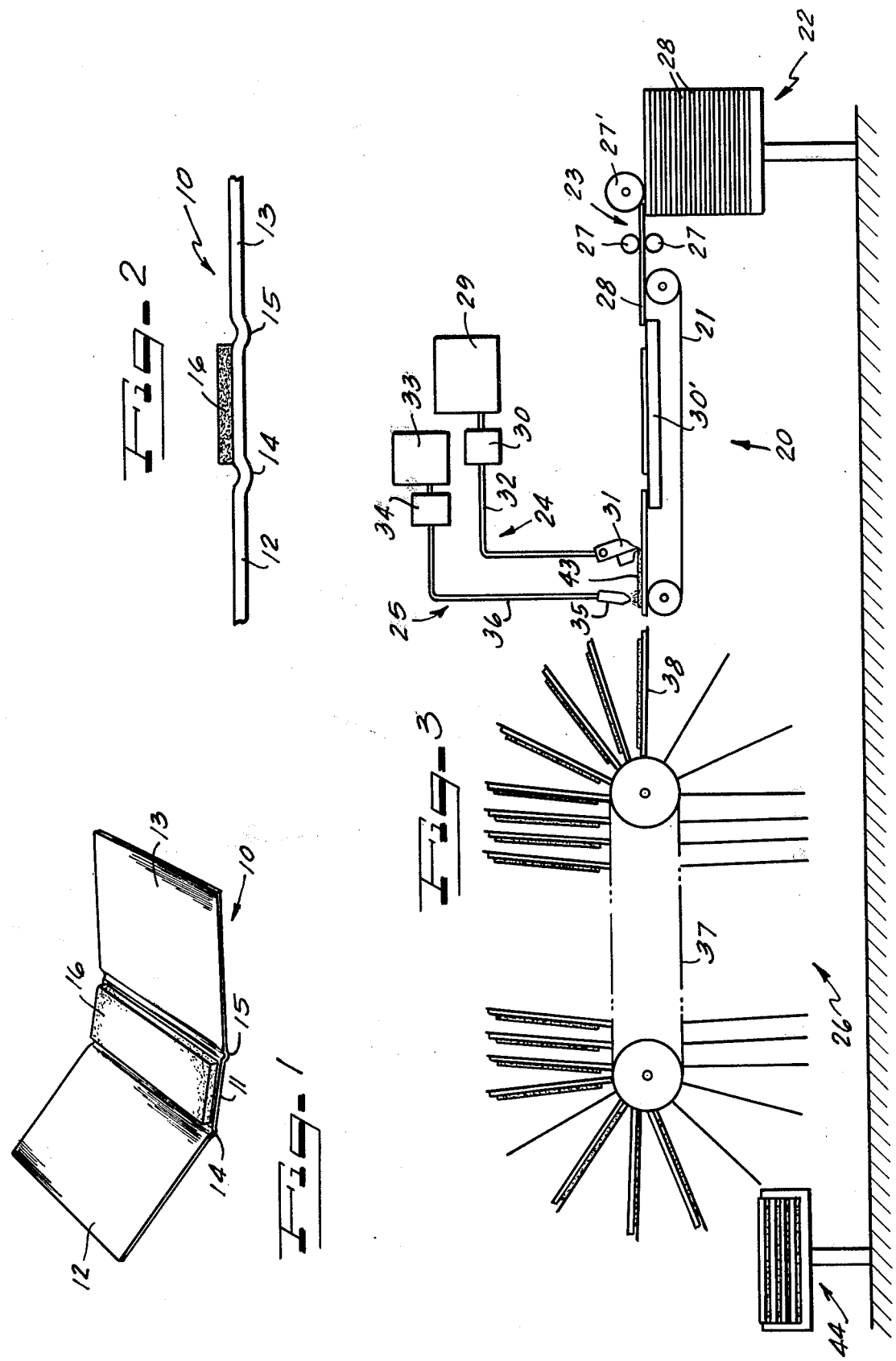

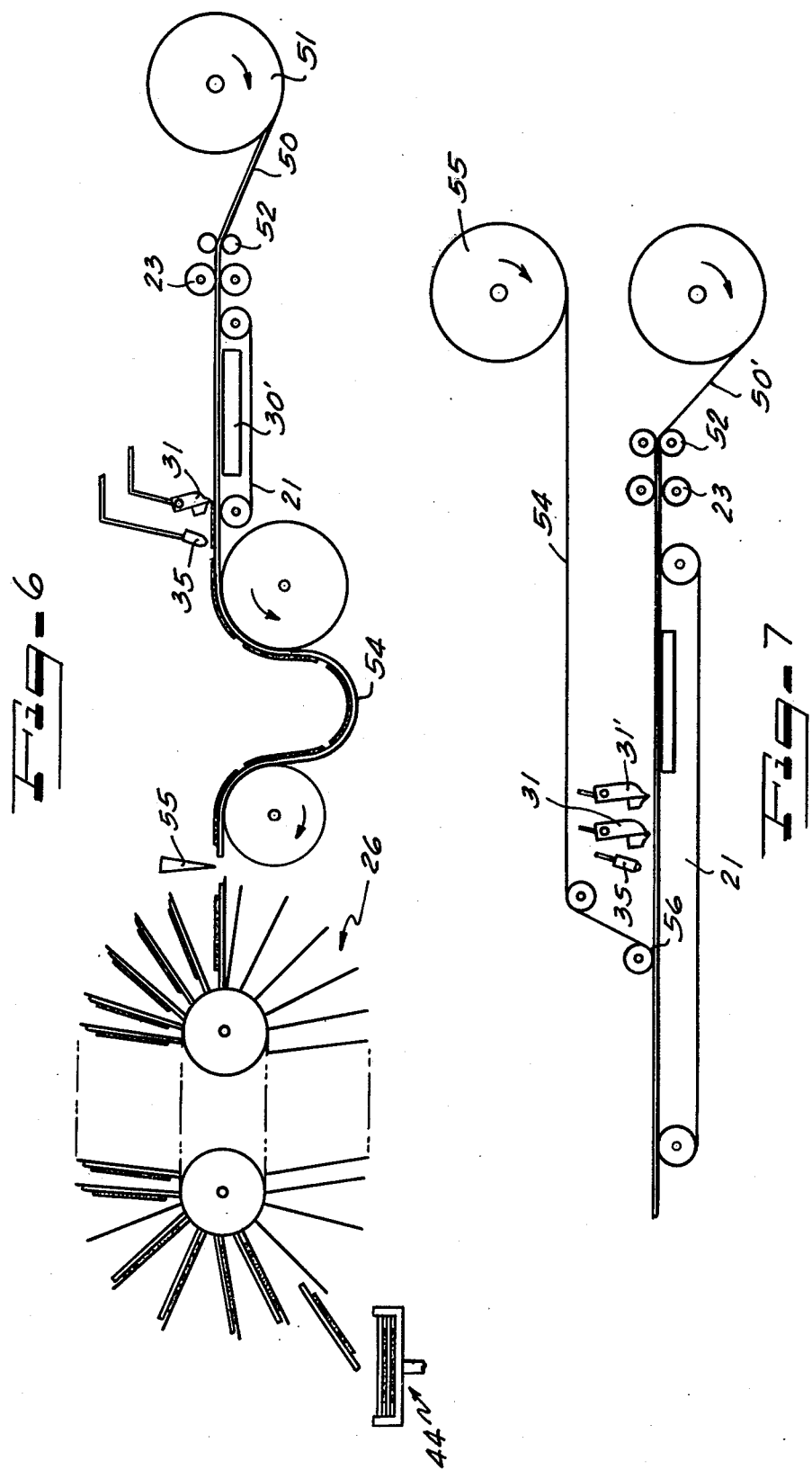

APPARATUS FOR MANUFACTURING ADHESIVE COVERS

This is a continuation, of application Ser. No. 558,794, filed Mar. 17, 1975 now abandoned.

BACKGROUND OF THE INVENTION

This invention relates to apparatus and methods for manufacturing adhesive covers.

Adhesive covers of the type contemplated to be manufactured by the processes disclosed herein are discussed in co-pending applications U.S. Ser. No. 265,305, now abandoned, U.S. Ser. No. 371,550, now abandoned, U.S. Ser. No. 468,133, now abandoned, U.S. Ser. No. 452,622, now abandoned, and U.S. Ser. No. 452,621, now abandoned, all assigned to the same assignee as this application.

SUMMARY OF THE INVENTION

It is an object of the present invention to provide a manufacturing process in which individual covers may be processed.

Another object of the invention is to provide a manufacturing process wherein a web of cover material is introduced into the process and converted into individual covers at the end of the process.

Another object of the invention is to provide a manufacturing process wherein a web of cover material is combined with a web of transparent cover material and converted into individual covers at the end of the process.

Another object of the invention is to provide in an adhesive cover manufacturing apparatus a hot melt adhesive applicator having a hot melt nozzle which may be manipulated during the manufacturing process to snap the string which is created between the nozzle applicator and the moving adhesive bead.

It is another object of the invention to provide means for quickly cooling the adhesive which has been applied to the cover material.

Other objects and advantages of the invention will become more apparent from the following description and the accompanying drawings.

BRIEF DESCRIPTION OF THE DRAWINGS

FIG. 1 is an isometric view of a typical adhesive cover for use on books having an adhesive strip formed on the inner surface of its backbone;

FIG. 2 is a partial end elevational view of the book cover as shown in FIG. 1;

FIG. 3 is a diagrammatic view in elevation of apparatus performing a series of in-line intermittent steps for processing individual adhesive covers;

FIG. 6 is a diagrammatic view in elevation of an in-line process arrangement for the manufacture of adhesive covers from a continuously flowing web of material;

FIG. 7 is a diagrammatic view in elevation showing an in-line arrangement similar to that shown in FIG. 6 but incorporating an additional web of transparent cover material which is combined with the continuously flowing cover stock.

DESCRIPTION OF PREFERRED EMBODIMENTS

Figure 4:
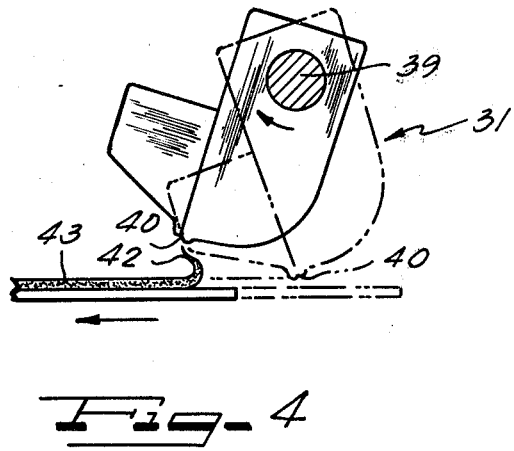
FIG. 4 is a view in elevation of a hot melt adhesive applicator used in connection with the processes described herein.

Referring now to FIGS. 1 and 2, the reference numeral 10 designates generally an adhesive cover of the type which may be manufactured by the apparatus and processes disclosed herein. The cover is provided with a backbone 11 and front and back cover members 12 and 13, respectively. The cover may be scribed or scored along lines 14 and 15 for flexing the cover members 12 and 13 with respect to the backbone 11. A thermally activatable adhesive layer 16 is secured to the backbone 11. A release agent may be applied to the surface of the layer 16 or alternatively to adjacent portions of the front and back cover members which might come in contact with the adhesive layer when the front or back covers are folded on the adhesive.

In FIG. 3 there is illustrated generally apparatus for processing individual adhesive covers of the type illustrated in FIGS. 1 and 2. This apparatus designated generally by the reference numeral 20 comprises a conveyor mechanism 21, a feeding apparatus 22 in the nature of a stock feeder, a scoring mechanism 23, a hot melt applicator system 24, a release agent applicator system 25, a cooling mechanism 26.

The scoring mechanism 23 may include a pair of nip wheels 27. The hot melt adhesive applicator system 24 may include a reservoir 29, a pump 30, and an applicator 31 with suitable conduit means 32 interconnecting the reservoir, pump and applicator so that hot melt adhesive may be sent to the applicator 31 via the conduit 32 as required.

The release agent applicator system 25 may include a release agent reservoir 33, a pump 34, an applicator 35, and conduit means 36 interconnecting the reservoir pump and applicator.

The cooling mechanism preferably is a wicket conveyor 26 which comprises generally an intermittently rotating chain mechanism 37 having attached thereto a series of supports or platforms 38 which are adapted to receive thereon individual processed adhesive covers.

Cut to size paper cover stock 28 which may be printed or unprinted are disposed in the stack feeder 22, and upon demand a vacuum feeder 27' feeds individual cover elements through nip wheels 27 of the scoring mechanism 23. These nip wheels are adapted to make a pair of scores or folding points in the cover sheet 28. Depending upon the commercial cover requirements, the scores can be introduced on the inside or outside of the sheet and/or additional scores placed elsewhere on the sheet. Although not essential with all cover stock materials, it is preferred that the sheet 28 be transported by the conveyor through a prewarming zone 30' utilizing appropriate heater means to heat the spine or backbone portion 11 to remove excess moisture therefrom. Such heating also aids in the subsequent application of hot melt adhesive and prevents formation of bubbles in the strip of adhesive which is laid down on the backbone 11.

The scored and pre-heated covers are next transported to a zone where the hot melt adhesive applicator 31 intimately engages the cover, measures off a short space from the leading cover edge, and then applies a substantially flat adhesive bead 43 to the spine portion. The mechanism preferably includes means whereby the feed length is carefully measured in transit and is stopped short of the trailing edge of the cover so that the spacing is the same as that generated at the leading edge. Thus the bead length is always shorter than the top to bottom dimension of the cover and ideally centered between the top and bottom edges. The bead width may vary according to commercial requirements but currently is available in ⅛ inch, ¼ inch, ⅜ inch, ½ inch, ⅝ inch, ¾ inch, ⅞ inch, and 1 inch widths. Other widths, of course, can be used. The bead is laid down between the paired fold points 14 and 15 and, preferably, does not lap over onto the scores 14 and 15. Bead thickness can be controlled from 0.002 inches to 0.060 inches by varying machine and processing variables but the greatest commercial use is to be found in bead thicknesses of 0.030 inches ±0.005 inches.

It should be explained here that the hot melt applicator 31 resolves a problem which is typical of many hot melt applicators. In situations, for example, where a product is moving past an applicator nozzle and it is desired to stop the flow of adhesive abruptly, the system sometimes incorporates a valve which is operable to interrupt the flow. Complete cessation of flow, however, is difficult to achieve with a good many hot melt formulations because a slender adhesive "string" remains attached to the moving bead and nozzle. This "string" is stretched to a smaller and smaller diameter as the tail end of the bead moves away from the applicator. This process continues until the "string" snaps, which is usually near the nozzle. This means that the "string" is connected to the cover which has just been processed and, subsequently, interferes with the cover's commercial usage. In addition, the "string" may affix itself to portions of the machinery and foul the next cover to be produced. The "string" effect is somewhat analogous to the pulling and stringing out of taffy. While altering the hot melt formula may minimize this effect, it may also lead to undesirable properties with respect to its functions as a book binding adhesive. While there are conventional and obvious techniques such as cutting, blowing, wiping, etc., which have been tried to overcome this problem, they actually have had little effect in doing so.

Figure 5:
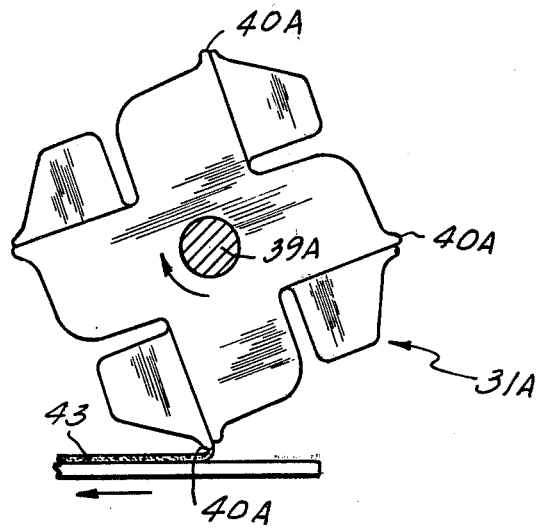
FIG. 5 is a view in elevation of another embodiment of a hot melt adhesive applicator which may be used with the processes described herein.

We have devised a solution to this problem by using applicators of the type illustrated in FIGS. 4 and 5. The applicator 31 of FIG. 4 may comprise an extrusion die pivotally mounted at 39 for reciprocating swinging movement between positions as illustrated, essentially, by the full and dotted line positions in FIG. 4. In the process we employ the idea of quickly flipping the nozzle 40 up and forward in the direction of the moving cover as cessation of adhesive flow is accomplished. Appropriate timing means may be provided to accomplish the flipping of the nozzle at the required times. This action snaps and breaks the string of adhesive at point 42, stretching from the retreating hot melt bead 43 on the cover to the application nozzle 40. The quick flipping motion of the nozzle simultaneously breaks the molten thread and flips the portion connected to the book up, forward, and onto the already applied adhesive on the retreating cover. Here it melts and blends into the still hot previously laid down bead 43. The applicator, as shown in FIG. 4, has a reciprocating action as indicated by the two positions shown in dotted and full lines, adequate means being provided in the apparatus to time the reciprocating movement of the applicator and the quick flipping motion of the nozzle toward the end of its swing.

Another version of a hot melt adhesive applicator 31A is illustrated in FIG. 5. This applicator may comprise an extrusion die which is pivotally mounted for rotation about the axis 39A and may include a plurality of nozzle portions 40A. As here shown, it includes four such nozzles. Appropriate indexing machinery may be provided to index this rotary applicator a predetermined number of degrees, preferably 45°, in the case of an applicator having four nozzles, for extruding and stopping positions. Here again with the applicator 31A, each successive nozzle is flipped up and forward in the direction of the moving covers 28 and, in so doing, snaps and breaks the string of adhesive stretching from the retreating hot melt bead on the cover to the applicator nozzle.

Referring to FIG. 3, the cover 28 which has now been scored and also contains molten adhesive, enters a zone where a release agent may be applied to the inside of the cover onto the adhesive. The release agent applicator system 25 may be designed to provide a liquid silicone release agent which is stored in a reservoir 33 and by suitable means such as the pump 34 and the conduit 36 led to the applicator 35 from whence it is sprayed onto the adhesive. In addition, the release agent applicator may be so designed as to spray release agent material on portions of the cover on each side of the adhesive bead but preferably not to exceed the bead width. In the latter case the release agent on the back or front cover members allows the back or front cover members to be folded over onto the adhesive strip attached to the backbone 11. This release agent coating does not affect the ultimate book binding properties of the adhesive and minimizes the sticking of this or any other cover to the adhesive when stacked, stored, or shipped in a container.

As an alternate measure, rather than spraying the adhesive with a release agent while the adhesive is in a molten condition, if the adhesive is allowed to cool until it is firm but still hot it is possible to apply an appropiately sized strip of silicone release paper to the still tacky adhesive. This superficially affixes the release papers to the adhesive but the release paper is easily removed during commercial usage. Another alternative is to spary the hot melt adhesive while still in the molten stage with discrete particles of materials such as glass beads or fine mesh powder particles.

The next step is to transport the processed cover 28 through a cooling zone to lower the molten adhesive temperature (which is applied at about 325° F. to 375° F.) below its tack point. In order to do this, the cover may be transported on a conveying mechanism which employs only ambient air cooling. This, however, requires a long conveyor which is objectionable. Its length can be reduced by the use of a forced air blower and proper directing means for directing chilled air onto the adhesive. In order to get away from the use of the objectionable long conveyor, we prefer to use other means.

The preferred and currently employed means of cooling is to introduce the treated cover 28 into an intermittently moving wicket conveyor 26, which permits ambient air cooling in a relatively small space. The processed covers are moved onto supporting members 38 of the wicket conveyor chain mechanism 37 which moves in the counterclockwise direction as viewed in FIG. 3. Upon exiting from the wicket conveyor, or other cooling means, the covers may be counted and stacked manually or automatically into a shipping container at a packaging station 44.

As an alternative to the step outlined above wherein liquid release agent is applied to the cover, silicone release paper strips may be introduced manually or automatically between covers facing one another at the time the covers are being stacked and prepared for storage or shipment.

A second embodiment of the process for manufacturing adhesive covers is shown in FIG. 6. It involves an in-line arrangement which flows continuously, except at the end where intermittency is used. In this arrangement a roll of printed or unprinted cover stock is used as a starting point rather than cut-to-size paper cover stock. A rolled up web of printed or unprinted cover stock 50 cut to proper width is arranged to pay out from an unreeler 51 and is fed into the subsequent process steps. The cover material could be preprinted on a web press, complete with registration marks. Registration marks need not be printed onto the web 50 if a commercially available moving ball memory device is used. If the web 50 is not preprinted with registration marks, it must be processed through a station which introduces such marks such, for example, as at 52. The web 50 proceeds through a scoring mechanism 23, as previously described, then through a pre-warming zone 30' where the spine portion of the cover-to-be is pre-heated before the application of hot melt adhesive. The web of cover stock 50 then moves into a hot melt adhesive application station at which point hot melt adhesive is supplied from the applicator 31 at the direction of registration marks which appear on the cover material. In this embodiment the hot melt applicator also preferably will be of the type previously described and illustrated in FIGS. 4 and 5. As the web 50 continues to move, it moves through a release agent station from whence a release agent is deposited on the adhesive from the release agent applicator 35 as previously described. A loop is then formed to permit the continuously flowing web 50 to operate in tandem with the intermittent cutting operation which is to follow. The web 50 proceeds to a cutting station where appropriate knife means 55 severs the web material of the cover stock as directed by the registration marks. Then, as previously, the individual covers enter a cooling station, preferably a wicket type cooler 26 as previously described. Once having passed through the wicket cooler, the covers are collected as before at a packaging station 44.

In FIG. 7 there is illustrated a third embodiment of an in-line processing arrangement which is similar to that illustrated in FIG. 6, but with the added factor that a web of transparent cover material is arranged to overlap the cover stock at the edge containing the adhesive. In this process the process starts with cover stock printed or unprinted in roll form and narrower than normal. The cover stock roll, in fact, is narrower by a little less than one of the leafs. As the web covers stock 50' is unreeled from its unreeler, it is run through an adhesive applicator station at whih point an adhesive applicator 31' which may be of the type previously described applies a band of adhesive approximately ⅜ inch wide to one end and from top to bottom, that is to cover the full length of the cover leaf. As the web 50' continues to move under the influence of the conveyor mechanism 21, additional hot melt adhesive is applied to the spine portion of the cover by the hot melt adhesive applicator 31 and then continues on to a station where a release agent may be applied by the release agent applicator 35 as previously described in connection with the first and second embodiments. It will be noted that the other alternative methods of applying a release agent as previously referred to may also be used.

In the process a transparent cover material is joined to the web cover stock 50' to form one of the leaves of the composite cover. Thus the device now includes a roll of transparent cover material 54 which is paid off from its unreeler 55 and is appropriately fed through the apparatus to a point 56 along the conveyor mechanism 21 at which point 56 the transparent cover material 54 overlaps the cover stock 50' at the edge containing the adhesive. The web of transparent cover material 54 may comprise, for example, rigid vinyl, acetate, or polyester. At point 56 the two webs 50' and 54 are joined and the remainder of the process is as described in connection with the embodiment of FIG. 6.

Figure 8:
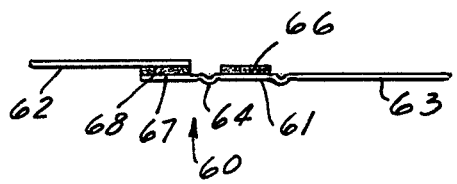
FIG. 8 is a view of an adhesive cover with the front and back cover members formed of different materials.
Figure 8A:
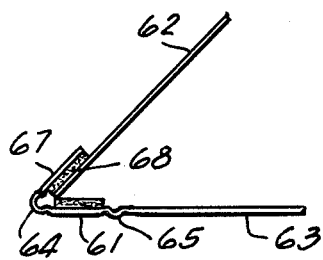
FIG. 8A is a view of the cover shown in FIG. 8 in a partially closed condition.

A cover of the type which may be made by the apparatus and process disclosed in FIG. 7 is illustrated in FIG. 8. The cover 60 is provided with a backbone 61 and front and back cover members 62 and 63. The front cover member 62 is of transparent cover material and the back cover 63 preferably is of an opaque material. The cover 60 may be scribed or scored along lines 64 and 65 for flexing the cover members 62 and 63 with respect to the backbone 61. A heat activatable adhesive layer 66 is secured to the backbone 61. It will be observed that a tab-like portion 67 forms a small part of the front leaf cover 62 with the cover 62 being attached thereto by means of an intermediate layer of adhesive 68.

It will be apparent that we have advantageously provided a manufacturing process wherein either individual covers or web cover material can be easily processed by having hot melt adhesive applied to the spine portion thereof and a release agent also applied to the cover material. In addition, in a modification of the process, a transparent cover material may be combined with opaque cover stock to form a composite cover having one of the front or back members made of a transparent cover material. Furthermore, we have provided a device for applying a hot melt adhesive to the backbone of a book cover in such a manner that the string effect often existing when cessation of application of the hot melt adhesive takes place is eliminated.

While preferred embodiments of the invention have been disclosed, it will be appreciated that these have been shown by way of example only, and the invention is not to be limited thereto as other variations probably will be apparent to those skilled in the art and the invention is to be given its fullest possible interpretation within the terms of the following claims.

What is claimed is:

1. Apparatus for manufacturing adhesive covers, each said cover having a backbone portion to which hot melt adhesive is applied, said apparatus comprising:

feed means for feeding cover material into the apparatus;

transport means moving said cover material forwardly in an edgewise direction;

scoring means for making score lines on the cover material to define a backbone on the cover;

pre-warming means for moving excess moisture from the cover backbone;

hot melt adhesive applicator means for applying adhesive to the backbone portion of the cover material; and cooling means for cooling the molten adhesive below its tack point;

said hot melt adhesive applicator means comprising an extrusion die including a plurality of discharge nozzles rotational about an axis transverse to the direction of movement of the cover material about which axis said extrusion die may be rotated to bring each of said discharge nozzles successively into position for extruding hot melt adhesive onto the moving cover material and whereby each of said discharge nozzles may be flipped away from the cover material and substantially forward in the direction of movement of the forward moving cover material as cessation of adhesive flow occurs to effect breaking of an adhesive thread created during the adhesive applying process.

2. Apparatus for manufacturing adhesive covers comprising:

feed means for feeding pre-cut cover material into the apparatus;

transport means moving said cover material forwardly in an edgewise direction;

scoring means for making score lines on the cover to define a backbone on the cover structure;

pre-warming means for removing excess moisture from the cover backbone;

hot melt adhesive applicator means for applying adhesive to the cover backbone; and cooling means for cooling the molten adhesive below its tack point, said hot melt adhesive applicator means being a rotary applicator including a plurality of discharge nozzles and a pivotal mounting means having an axis generally transverse to the direction of movement of the cover material about which axis said rotary applicator may be rotated to bring each of said discharge nozzles successively into position for extruding hot melt adhesive onto the moving cover material, said extrusion die being adapted to be pivotally flipped away from the cover material and substantially forward in the direction of movement of the moving cover material as cessation of adhesive flow occurs to effect breaking of an adhesive tail created during the adhesive applying process.

3. Apparatus for manufacting adhesive covers, said cover having a backbone portion to which hot melt adhesive is applied, said apparatus comprising:

feed means for feeding cover material into the apparatus;

transport means moving said cover material forwardly in an edgewise direction;

scoring means for making score lines on the cover material to define a backbone on the cover;

pre-warming means for removing excess moisture from the cover backbone;

hot melt adhesive applicator means for applying adhesive to the backbone portion of the cover material;

said hot melt adhesive applicator means comprising an extrusion die having at least one discharge nozzle, said extrusion die being rockably mounted about a pivot axis substantially spaced from the transport means and generally transverse to the direction of movement of the cover material whereby said at least one discharge nozzle may be flipped away from the cover material as cessation of adhesive flow occurs with the component of movement of said at least one discharge nozzle in the direction of movement of the forward moving cover material being substantially greater than its component of movement away from the cover material thereby breaking the adhesive thread created during the adhesive applying process and displacing it in said forward direction; and cooling means for cooling the molten adhesive below its tack point.

4. The apparatus of claim 3 wherein
said extrusion die has one discharge nozzle.

5. The apparatus of claim 3 including
means for measuring off a distance on the cover material to define the proper limits within which an adhesive bead is to be applied and said hot melt adhesive applicator means is adapted to intimately engage the cover material during application of the adhesive thereto.

6. The apparatus of claim 3 wherein
said cooling means is a wicket cooler.

7. The apparatus of claim 3 including
a release agent applicator system for applying a release agent to the adhesive to reduce the tack of the adhesive which has previously been deposited on the cover material.

8. The apparatus of claim 7 wherein
said release agent applicator system includes means for applying a liquid silicone release agent to the adhesive before it cools.

9. The apparatus of claim 3 including
means for applying a strip of silicone release paper to the adhesive after it has partially cooled but is still hot.

10. The apparatus of claim 3 including
means for introducing silicone release paper sheets between the finished covers during a stacking operation after the covers have been cooled.

11. The apparatus of claim 3 wherein
the cover material fed through the apparatus for making the covers is a continuous web of material; and including
cutting means disposed downstream from said hot melt adhesive applicator means and upstream from said cooling means for cutting the web material into desired cover lengths.

12. Apparatus for manufacturing adhesive covers comprising:

feed means for feeding pre-cut cover material into the apparatus;

transport means moving said cover material forwardly in an edgewise direction;

scoring means for making score lines on the cover material to define a backbone on the cover material;

pre-warming means for removing excess moisture from the cover backbone;

hot melt adhesive applicator means for applying adhesive to the cover backbone;

said hot melt adhesive applicator means comprising a pivoting extrusion die having at least one discharge nozzle, said extrusion die being pivoted about a pivot axis located generally transverse to the direction of movement of the cover material and further from said transport means than the distance between a normal to the transport means passing through the pivot and the point of application of adhesive whereby the nozzle is pivotally flipped away from the cover material substantially forward in the direction of movement of the moving cover material as cessation of adhesive flow occurs to effect breaking of the adhesive tail created during the adhesive applying process and displacing the tail forwardly; and cooling means for cooling the molten adhesive below its tack point.

13. The apparatus of claim 12 wherein
said feed means includes a vacuum feeder for feeding pre-cut covers into the apparatus.

14. The apparatus of claim 12 wherein
said extrusion die has one discharge nozzle.

15. The apparatus of claim 12 including
means for measuring off a distance on the cover material to define the proper limits within which an adhesive bead is to be applied and said hot melt adhesive applicator means is adapted to intimately engage the cover material during application of the adhesive thereto.

16. The apparatus of claim 12 wherein
said cooling means is a wicket cooler.

17. The apparatus of claim 12 including
a release agent applicator system for applying a release agent to the adhesive to reduce the tack of the adhesive which has previously been deposited on the cover material.

18. The apparatus of claim 17 wherein
said release agent applicator system includes means for applying a liquid silicone release agent to the adhesive before it cools.

19. The apparatus of claim 12 including
means for applying a strip of silicone release paper to the adhesive after it has partially cooled but is still hot.

20. The apparatus of claim 12 including
means for introducing silicone release paper sheets between the finished covers during a stacking operation after the covers have been cooled.

21. The apparatus of claim 12 including
means for measuring off a distance on the cover material to define the proper limits within which an adhesive bead is to be applied and said hot melt adhesive applicator means is adapted to intimately engage the cover material during application of the adhesive thereto; and further including a release agent applicator system for applying a release agent to the adhesive to reduce the tack of the adhesive which has previously been deposited on the cover material; and wherein said cooling means is a wicket cooler.

* * * * *